United States Patent [19]

Schoch

[11] 4,136,759
[45] Jan. 30, 1979

[54] BICYCLE RIM BRAKE

[75] Inventor: Robert Schoch, Singen, Hohentwiel, Fed. Rep. of Germany

[73] Assignee: Weinmann GmbH & Co. KG, Singen, Hohentwiel, Fed. Rep. of Germany

[21] Appl. No.: 856,018

[22] Filed: Nov. 30, 1977

[30] Foreign Application Priority Data

Dec. 9, 1976 [DE] Fed. Rep. of Germany ....... 2655699

[51] Int. Cl.² ................................................ B62L 1/10
[52] U.S. Cl. ..................................... 188/24; 188/72.3; 188/72.9
[58] Field of Search ...................... 188/24, 25, 26, 27, 188/72.3, 72.7, 72.9

[56] References Cited

U.S. PATENT DOCUMENTS

| 3,342,291 | 9/1967 | Warwick et al. | 188/72.9 |
| 4,008,903 | 2/1977 | Ramond | 188/24 |

FOREIGN PATENT DOCUMENTS

| 916858 | 12/1946 | France | 188/24 |
| 961677 | 5/1950 | France | 188/24 |
| 57872 | 9/1953 | France | 188/24 |
| 180566 | 1/1936 | Switzerland | 188/24 |
| 237541 | 8/1945 | Switzerland | 188/24 |

Primary Examiner—Edward R. Kazenske
Attorney, Agent, or Firm—Learman & McCulloch

[57] ABSTRACT

A bicycle wheel rim brake comprises a pair of extensible and retractable brake members mounted in bicycle frame members which straddle the wheel rim. Each brake member is symmetrical about the longitudinal axis of its frame member and is slidably mounted in an opening formed in a support for movements toward and away from the rim. A cover is carried by each support and overlies the associated opening. Springs acting between the covers and the brake members bias the latter away from the rim and hold the covers in place.

4 Claims, 4 Drawing Figures

BICYCLE RIM BRAKE

The invention relates to a bicycle rim brake, particularly for a front wheel, in which each brake lining is movable inwardly in braking engagement with the rim by a toggle lever which is operated by a Bowden control cable and which is pivotably mounted on a tube of the bicycle frame, each brake lining being returned outwardly of the rim by spring tension.

Known bicycle rim brakes of the aforesaid type (cf. the French patent of addition 76617 on 1 228 972, for example) provide a toggle lever with a brake lining attached to it on each side of the rim. Such toggle levers are in each case positioned on one side of the frame tubing supporting them, i.e., asymmetrically with respect to the frame tubing.

The great disadvantage of this known type of construction is the tendency of the toggle lever to distort and to vibrate when sudden braking is effected, which leads to a considerable decrease in braking efficiency and often to objectionable noises.

An object of the present invention is to provide a bicycle rim brake which will avoid the above-mentioned disadvantages, i.e., which will prevent distortion and vibration of the actuating mechanisms carrying the brake linings.

This object is achieved according to the present invention in that a bearing support containing the bearing spindle for the toggle lever is inserted into the frame tubing in such manner that the brake lining, a brake member carrying the brake lining, and the toggle lever which effects operation of the brake member are arranged symmetrically with respect to the frame tubing.

This symmetrical arrangement of the brake lining, the brake member and of the toggle lever (as regards symmetry with respect to the frame tubing supporting these parts of the rim brake) achieves ideal self-centering of the rim brake, even in unfavorable operating conditions. This prevents the undesirable distortion and disturbing vibrations which arise because of the unilateral arrangement employed by other known constructions. The rim brake according to this invention is distinguished by a particularly high and uniform degree of braking efficiency.

A preferred embodiment of the invention is disclosed in more detail in the following description and and accompanying drawings wherein.

Figure 1:
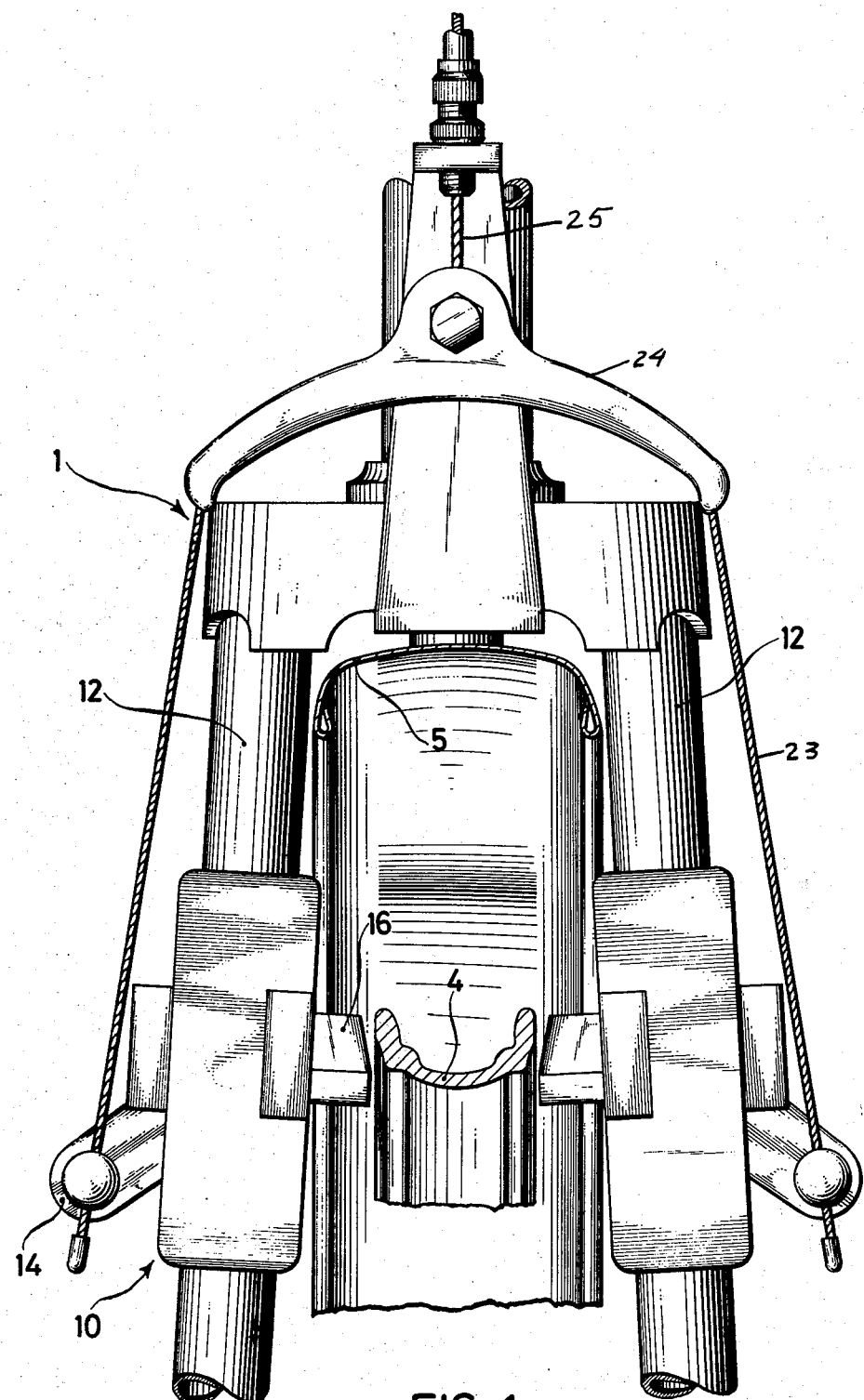
FIG. 1 is a fragmentary, front elevational view of a bicycle rim brake constructed according to the invention.

A brake assembly constructed according to the invention is adapted for use on a conventional bicycle having a front fork 1 including a pair of tubular frame members 12 straddling the front wheel rim 4 and a mud guard 5. The brake assembly includes a pair of brake units 10 of like construction, one unit being mounted on each frame member 12 in confronting relations and adjacent the rim 4. As will be explained in greater detail hereinafter, the mounting of each brake unit 10 is such as to avoid distortion about the axis of its frame 12.

Figure 2:
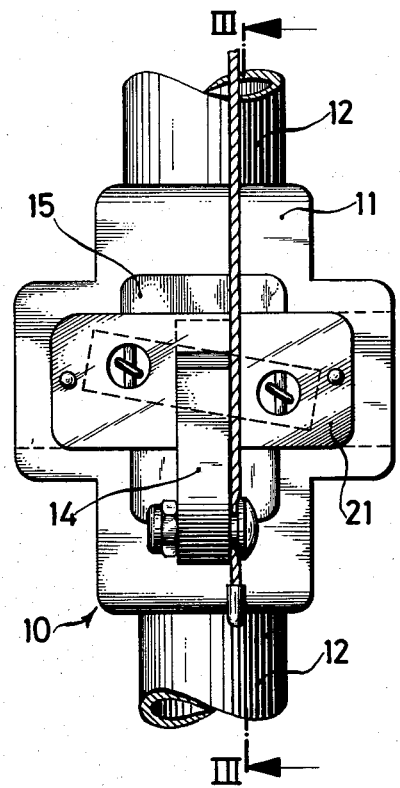
FIG. 2 is a fragmentary, side elevational view of the rim brake.
Figure 3:
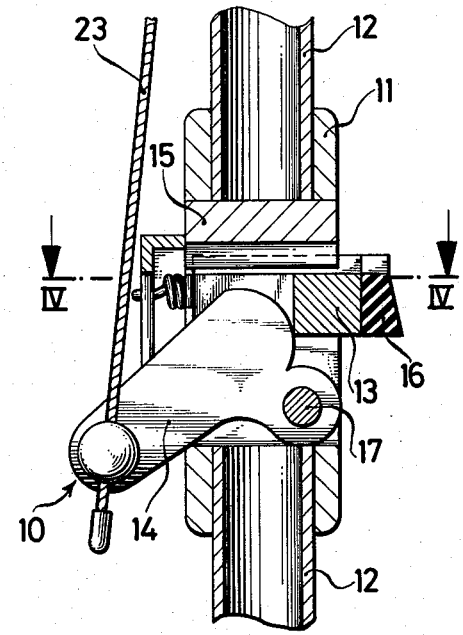
FIG. 3 is a cross-sectional view taken along the line III—III of FIG. 2.
Figure 4:
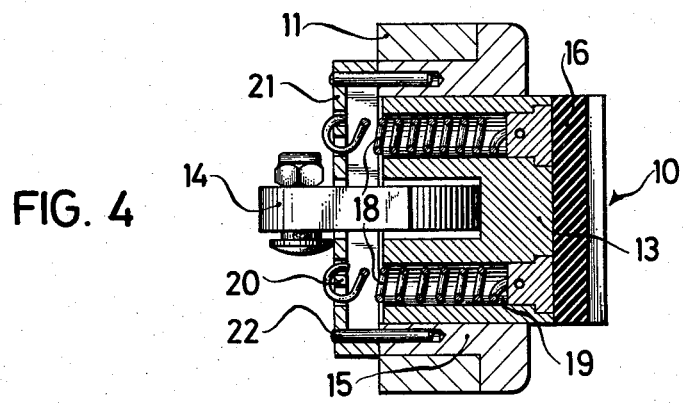
FIG. 4 is a cross-sectional view taken along the line IV—IV of FIG. 3.

FIGS. 2–4 illustrate details of the rim brake according to the invention. Each brake unit 10 includes a casing or housing 11 that is soldered into and forms a part of the associated frame tubing 12 of the front wheel fork. The casing 11 accommodates a support 15 which carries a brake member 13 and an actuating rocker arm or lever 14. The brake member 13 is furnished with a brake lining 16 that confronts the rim 4 and is slidably supported in the support 15 for movements toward and away from the rim. The lever 14 is pivotably mounted about spindle 17 carried by the support 15, and includes an elbow that bears on the brake member 13.

The brake member 13 has a pair of bores 19 in each of which is accommodated a tension spring 18. One end of each spring is connected to a plug at the corresponding end of the bore and the opposite end of each spring is connected to a pin 20 fixed on a cover plate 21. Locating pins 22 carried by the plate 21 are received in openings formed in the support 15. The cover plate is maintained in assembled relation with the member 13 by the springs.

Each actuating lever 14 is fixed to an operating cable 23 carried by a yoke 24 that is joined to one end of a Bowden cable 25. The other end of the cable 25 is connected to a hand-operated brake applying mechanism (not shown) as is conventional.

Each suppport 15 preferably comprises a light metal alloy or a plastic material. The brake member 13 is either made of metal or of a plastic which is resistant to compression, weather resistant, and of a low coefficient of friction.

If the tubes 12 of the front wheel fork consist of steel, then the casing is preferably made of annealed cast iron. However, it is also possible to forge the tubing 12 in one piece with the casing 11 from an aluminum alloy.

As can be seen from FIGS. 3 and 4 of the drawings, the brake member 13 features a guide slot for engageing the toggle lever 14 on the side that is remote from the brake lining. Likewise, the cover plate 21 also has a slot for the passage of the toggle lever 14.

In operation, upward movement of the cable 23, as viewed in FIG. 1, rocks the actuating levers 14 about their pivot pins 17 and moves the brake members outwardly of the supports 15 toward one another to enable the opposed brake linings 16 to apply a braking force on the rim 4. When the upward force on the cable 23 is relieved, the springs 18 return the brake members to their retracted positions within the supports, thereby releasing the braking force.

What is claimed is:

1. A brake assembly for a bicycle having a pair of frame members straddling a wheel including a rim, said assembly comprising a support fitted to each of said frame members and confronting one another adjacent said rim; a brake member carried by each of said supports for movements toward one another into braking engagement with said rim; an actuating lever carried by each of said supports and engageable with the respective brake members for moving them toward said rim; a cover on each of said supports and having an opening therein through which the associated lever extends; means coupled to said levers for operating the latter; said supports said brake members, and said actuating levers being symmetrical with respect to said frame members, and spring means acting on the respective brake members and yieldably biasing them in directions away from said rim, said spring means being connected to the associated cover for maintaining the latter on its support.

2. The assembly according to claim 1 wherein each of said supports is fitted into and comprises a part of the associated frame member.

3. The assembly according to claim 1 including brake lining material carried by each of said brake members in a position to engage said rim.

4. The assembly according to claim 1 wherein each of said brake members is composed of a rigid, compression resistant material having a low coefficient of friction.

* * * * *